(12) United States Patent
Behling et al.

(10) Patent No.: US 10,640,689 B2
(45) Date of Patent: *May 5, 2020

(54) ACRYLIC-BASED FLEXIBLE ASSEMBLY LAYER

(71) Applicant: 3M INNOVATIVE PROPERTIES COMPANY, St. Paul, MN (US)

(72) Inventors: Ross E. Behling, Woodbury, MN (US); Jason D. Clapper, Lino Lakes, MN (US); Albert I. Everaerts, Tucson, AZ (US); Belma Erdogan-Haug, Woodbury, MN (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 102 days.

This patent is subject to a terminal disclaimer.

(21) Appl. No.: 15/573,938

(22) PCT Filed: Jun. 1, 2016

(86) PCT No.: PCT/US2016/035143
§ 371 (c)(1),
(2) Date: Nov. 14, 2017

(87) PCT Pub. No.: WO2016/196541
PCT Pub. Date: Dec. 8, 2016

(65) Prior Publication Data
US 2018/0291240 A1    Oct. 11, 2018

Related U.S. Application Data

(60) Provisional application No. 62/170,469, filed on Jun. 3, 2015.

(51) Int. Cl.
| | |
|---|---|
| *C09J 133/08* | (2006.01) |
| *B32B 7/12* | (2006.01) |
| *B32B 27/30* | (2006.01) |
| *C09J 4/00* | (2006.01) |
| *C09D 4/00* | (2006.01) |
| *C08F 220/18* | (2006.01) |
| *C09J 7/10* | (2018.01) |
| *B32B 7/00* | (2019.01) |
| *C09J 7/40* | (2018.01) |
| *B32B 27/08* | (2006.01) |

(52) U.S. Cl.
CPC .............. *C09J 133/08* (2013.01); *B32B 7/00* (2013.01); *B32B 7/12* (2013.01); *B32B 27/08* (2013.01); *B32B 27/30* (2013.01); *B32B 27/308* (2013.01); *C08F 220/18* (2013.01); *C09D 4/00* (2013.01); *C09J 4/00* (2013.01); *C09J 7/10* (2018.01); *C09J 7/405* (2018.01); *B32B 2307/542* (2013.01); *B32B 2307/546* (2013.01); *B32B 2307/732* (2013.01); *B32B 2457/00* (2013.01); *B32B 2457/20* (2013.01); *C09J 2201/622* (2013.01); *C09J 2203/318* (2013.01); *C09J 2203/322* (2013.01); *C09J 2433/00* (2013.01)

(58) Field of Classification Search
CPC ....... B32B 2457/20; B32B 7/12; C09J 133/08
See application file for complete search history.

(56) References Cited

U.S. PATENT DOCUMENTS

| | | |
|---|---|---|
| 2,676,182 A | 4/1954 | Daudt |
| 3,627,851 A | 12/1971 | Brady |
| 3,772,247 A | 11/1973 | Flannigan |
| 3,890,269 A | 6/1975 | Martin |
| 4,619,979 A | 10/1986 | Kotnour |
| 4,661,577 A | 4/1987 | Jo Lane |
| 4,707,531 A | 11/1987 | Shirahata |
| 4,774,310 A | 9/1988 | Butler |
| 4,843,134 A | 6/1989 | Kotnour |
| 4,935,484 A | 6/1990 | Wolfgruber |
| 5,026,890 A | 6/1991 | Webb |
| 5,110,890 A | 5/1992 | Butler |
| 5,214,114 A | 5/1993 | Takahashi |
| 5,214,119 A | 5/1993 | Leir |
| 5,248,739 A | 9/1993 | Schmidt |
| 5,262,558 A | 11/1993 | Kobayashi |
| 5,276,122 A | 1/1994 | Aoki |
| 5,302,685 A | 4/1994 | Tsumura |
| 5,319,040 A | 6/1994 | Wengrovius |
| 5,461,134 A | 10/1995 | Leir |
| 5,512,650 A | 4/1996 | Leir |
| 5,514,730 A | 5/1996 | Mazurek |
| 5,637,646 A | 6/1997 | Ellis |
| 5,804,610 A | 9/1998 | Hamer |
| 5,866,222 A | 2/1999 | Seth |
| 5,907,018 A | 5/1999 | Mazurek |

(Continued)

FOREIGN PATENT DOCUMENTS

| | | |
|---|---|---|
| EP | 2578655 | 4/2013 |
| EP | 2815880 | 12/2014 |

(Continued)

OTHER PUBLICATIONS

Machine translation of JP-2014074122-A, 2019 (Year: 2019).*

(Continued)

*Primary Examiner* — Liam J Heincer

(74) *Attorney, Agent, or Firm* — 3M Innovative Properties Compa

(57) ABSTRACT

The present invention is an assembly layer for a flexible device. The assembly layer is derived from precursors that include an alkyl(meth)acrylate ester having 1 to 24 carbon atoms in the alkyl group and a free-radical generating initiator. Within a temperature range of between −30° C. to 90° C., the assembly layer has a shear storage modulus at a frequency of 1 Hz that does not exceed 2 MPa, a shear creep compliance (J) of at least 6×10$^{-6}$ 1/Pa measured at 5 seconds with an applied shear stress between 50 kPa and 500 kPa, and a strain recovery of at least 50% at at least one point of applied shear stress within the range of 5 kPa to 500 kPa within 1 minute after removing the applied shear stress. In a preferred embodiment, the flexible device is a flexible electronic display.

20 Claims, No Drawings

(56) References Cited

U.S. PATENT DOCUMENTS

| | | |
|---|---|---|
| 6,355,759 B1 | 3/2002 | Sherman |
| 6,407,195 B2 | 6/2002 | Sherman |
| 6,441,118 B2 | 8/2002 | Sherman |
| 6,531,620 B2 | 3/2003 | Brader |
| 6,664,359 B1 | 12/2003 | Kangas |
| 6,846,893 B1 | 1/2005 | Sherman |
| 7,084,209 B2 | 8/2006 | Everaerts |
| 7,153,924 B2 | 12/2006 | Kuepfer |
| 7,255,920 B2 * | 8/2007 | Everaerts ............... B32B 7/06 428/355 AC |
| 7,371,464 B2 | 5/2008 | Sherman |
| 7,494,708 B2 | 2/2009 | Everaerts |
| 7,501,184 B2 | 3/2009 | Leir |
| 8,137,807 B2 | 3/2012 | Clapper |
| 8,232,350 B2 | 7/2012 | Fujita |
| 8,541,481 B2 | 9/2013 | Determan |
| 8,551,616 B2 | 10/2013 | Joseph |
| 8,765,881 B2 | 7/2014 | Hays |
| 9,399,724 B2 | 7/2016 | Lewandowski |
| 2006/0024521 A1 | 2/2006 | Everaerts |
| 2007/0148475 A1 | 6/2007 | Sherman |
| 2012/0094037 A1 | 4/2012 | Banba |
| 2013/0070468 A1 | 3/2013 | Kuepper |
| 2013/0126079 A1 * | 5/2013 | Lee ............... C08G 18/6229 156/247 |
| 2013/0260149 A1 | 10/2013 | Clapper |
| 2013/0323521 A1 * | 12/2013 | Xia ............... C09J 133/08 428/523 |
| 2014/0065389 A1 | 3/2014 | Loy |
| 2014/0295150 A1 | 10/2014 | Bower |
| 2014/0367644 A1 | 12/2014 | Song |
| 2015/0004405 A1 * | 1/2015 | Clapper ............... C08L 33/10 428/354 |
| 2015/0184031 A1 * | 7/2015 | Yurt ............... C09J 4/06 428/339 |
| 2015/0346408 A1 | 12/2015 | Mizutani |
| 2016/0122600 A1 * | 5/2016 | Moon ............... C09J 133/14 428/354 |
| 2016/0145473 A1 * | 5/2016 | Yoon ............... C09J 11/04 428/356 |
| 2016/0162076 A1 * | 6/2016 | Fukagawa ............... C09J 7/00 345/174 |
| 2016/0215175 A1 * | 7/2016 | Yoon ............... G06F 3/041 |
| 2016/0289513 A1 * | 10/2016 | Behling ............... C09J 133/066 |
| 2017/0198170 A1 * | 7/2017 | Clapper ............... C09J 5/00 |
| 2017/0309867 A1 * | 10/2017 | Mun ............... C09J 133/066 |
| 2018/0118982 A1 * | 5/2018 | Campbell ............... C09J 9/00 |
| 2018/0265748 A1 * | 9/2018 | Behling ............... C09J 7/385 |
| 2018/0291238 A1 * | 10/2018 | Erdogan-Haug ............... B32B 7/12 |
| 2019/0062608 A1 * | 2/2019 | Aloshyna ep Lesuffleur ............... B32B 7/12 |

FOREIGN PATENT DOCUMENTS

| | | | |
|---|---|---|---|
| EP | 3057163 | | 8/2016 |
| JP | 2014012784 | | 1/2014 |
| JP | 2014074122 A | * | 4/2014 |
| JP | 2014152225 | | 8/2014 |
| JP | 2015016653 | | 1/2015 |
| JP | 2015017207 | | 1/2015 |
| WO | WO 1997-40103 | | 10/1997 |
| WO | WO 2009-111433 | | 9/2009 |
| WO | WO 2010-147047 | | 12/2010 |
| WO | WO 2012-112856 | | 8/2012 |
| WO | WO 2014-091863 | | 6/2014 |
| WO | WO 2014-130507 | | 8/2014 |
| WO | WO 2015-053304 | | 4/2015 |
| WO | WO 2016-196458 | | 12/2016 |
| WO | WO 2016-196460 | | 12/2016 |
| WO | WO 2016-196576 | | 12/2016 |

OTHER PUBLICATIONS

Encyclopedia of Polymer Science and Engineering, John Wiley & Sons, New York, 265-270 (1989).

"Thermal Transitions of Homopolymers: Glass Transition & Melting Point", Polymer Products from Aldrich, [retrieved from the internet on Jan. 12, 2018], URL <https://www3.nd.edu/~hgao/thermal_transitions_of_homopolymers.pdf>, pp. 52-53, XP55117588A.

International Search Report for PCT International Application No. PCT/US2016/035143, dated Sep. 1, 2016, 6pgs.

* cited by examiner

ACRYLIC-BASED FLEXIBLE ASSEMBLY LAYER

FIELD OF THE INVENTION

The present invention is related generally to the field of flexible assembly layers. In particular, the present invention is related to an acrylic-based flexible assembly layer.

BACKGROUND

A common application of pressure-sensitive adhesives in the industry today is in the manufacturing of various displays, such as computer monitors, TVs, cell phones and small displays (in cars, appliances, wearables, electronic equipment, etc.). Flexible electronic displays, where the display can be bent freely without cracking or breaking, is a rapidly emerging technology area for making electronic devices using, for example, flexible plastic substrates. This technology allows integration of electronic functionality into non-planar objects, conformity to desired design, and flexibility during use that can give rise to a multitude of new applications.

With the emergence of flexible electronic displays, there is an increasing demand for adhesives, and particularly for optically clear adhesives (OCA), to serve as an assembly layer or gap filling layer between an outer cover lens or sheet (based on glass, PET, PC, PMMA, polyimide, PEN, cyclic olefin copolymer, etc.) and an underlying display module of electronic display assemblies. The presence of the OCA improves the performance of the display by increasing brightness and contrast, while also providing structural support to the assembly. In a flexible assembly, the OCA will also serve at the assembly layer, which in addition to the typical OCA functions, may also absorb most of the folding induced stress to prevent damage to the fragile components of the display panel and protect the electronic components from breaking under the stress of folding. The OCA layer may also be used to position and retain the neutral bending axis at or at least near the fragile components of the display, such as for example the barrier layers, the driving electrodes, or the thin film transistors of an organic light emitting display (OLED).

If used outside of the viewing area of a display or photo-active area of a photovoltaic assembly, it is not necessary that the flexible assembly layer is optically clear. Indeed, such material may still be useful for example as a sealant at the periphery of the assembly to allow movement of the substrates while maintaining sufficient adhesion to seal the device.

Typical OCAs are visco-elastic in nature and are meant to provide durability under a range of environmental exposure conditions and high frequency loading. In such cases, a high level of adhesion and some balance of visco-elastic property is maintained to achieve good pressure-sensitive behavior and incorporate damping properties in the OCA. However, these properties are not fully sufficient to enable foldable or durable displays.

Due to the significantly different mechanical requirements for flexible display assemblies, there is a need to develop novel adhesives for application in this new technology area. Along with conventional performance attributes, such as optical clarity, adhesion, and durability, these OCAs need to meet a new challenging set of requirements such as bendability and recoverability without defects and delamination.

SUMMARY

In one embodiment, the present invention is an assembly layer for a flexible device. The assembly layer is derived from precursors that include an alkyl(meth)acrylate ester having 1 to 24 carbon atoms in the alkyl group and a free-radical generating initiator. Within a temperature range of between about −30° C. to about 90° C., the assembly layer has a shear storage modulus at a frequency of 1 Hz that does not exceed about 2 MPa, a shear creep compliance (J) of at least about $6 \times 10^{-6}$ 1/Pa measured at 5 seconds with an applied shear stress between about 50 kPa and about 500 kPa, and a strain recovery of at least about 50% at at least one point of applied shear stress within the range of about 5 kPa to about 500 kPa within about 1 minute after removing the applied shear stress.

In another embodiment, the present invention is a laminate including a first substrate, a second substrate, and an assembly layer positioned between and in contact with the first substrate and the second substrate. The assembly layer is derived from precursors that include an alkyl(meth)acrylate ester having 1 to 24 carbon atoms in the alkyl group and a free-radical generating initiator. Within a temperature range of between about −30° C. to about 90° C., the assembly layer has a shear storage modulus at a frequency of 1 Hz that does not exceed about 2 MPa, a shear creep compliance (J) of at least about $6 \times 10^{-6}$ 1/Pa measured at 5 seconds with an applied shear stress between about 50 kPa and about 500 kPa, and a strain recovery of at least about 50% at at least one point of applied shear stress within the range of about 5 kPa to about 500 kPa within about 1 minute after removing the applied shear stress.

In yet another embodiment, the present invention is a method of adhering a first substrate and a second substrate, wherein both of the first and the second substrates are flexible. The method includes positioning an assembly layer between the first substrate and the second substrate and applying pressure and/or heat to form a laminate. The assembly layer is derived from precursors that include an alkyl(meth)acrylate ester having 1 to 24 carbon atoms in the alkyl group and a free-radical generating initiator. Within a temperature range of between about −30° C. to about 90° C., the assembly layer has a shear storage modulus at a frequency of 1 Hz that does not exceed about 2 MPa, a shear creep compliance (J) of at least about $6 \times 10^{-6}$ 1/Pa measured at 5 seconds with an applied shear stress between about 50 kPa and about 500 kPa, and a strain recovery of at least about 50% at at least one point of applied shear stress within the range of about 5 kPa to about 500 kPa within about 1 minute after removing the applied shear stress.

DETAILED DESCRIPTION

The present invention is an acrylic-based assembly layer usable, for example, in a flexible devices, such as electronic displays, flexible photovoltaic cells or solar panels, and wearable electronics. As used herein, the term "assembly layer" refers to a layer that possesses the following properties: (1) adherence to at least two flexible substrates and (2) sufficient ability to hold onto the adherends during repeated flexing to pass the durability testing. As used herein, a "flexible device" is defined as a device that can undergo repeated flexing or roll up action with a bend radius as low as 200 mm, 100 mm, 50 mm, 20 mm, 10 mm, 5 mm, or even less than 2 mm. The acrylic-based assembly layer is soft, is predominantly elastic with good adhesion to plastic films or other flexible substrates like glass, and has high tolerance for shear loading. In addition, the acrylic-based assembly layer has relatively low modulus, high percent compliance at moderate stress, a low glass transition temperature, generation of minimal peak stress during folding, and good strain recovery after applying and removing stress, making it suitable for use in a flexible assembly because of its ability to withstand repeated folding and unfolding. Under repeated flexing or rolling of a multi-layered construction, the shear loading on the adhesive layers becomes very significant and any form of stress can cause not only mechanical defects (delamination, buckling of one or more layers, cavitation bubbles in the adhesive, etc.) but also optical defects or Mura. Unlike traditional adhesives that are mainly viscoelastic in character, the acrylic-based assembly layer of the present invention is predominantly elastic at use conditions, yet maintains sufficient adhesion to pass a range of durability requirements. In one embodiment, the acrylic-based assembly layer is optically clear and exhibits low haze, high visible light transparency, anti-whitening behavior, and environmental durability.

The acrylic-based assembly layer of the present invention is prepared from select acrylic monomer compositions and cross-linked at different levels to offer a range of elastic properties, while still generally meeting all optically clear requirements. For example, an acrylic-based assembly layer used within a laminate with a folding radius as low as 5 mm or less can be obtained without causing delamination or buckling of the laminate or bubbling of the adhesive. In one embodiment, the acrylic-based assembly layer composition is derived from precursors that include at least one alkyl (meth)acrylate ester having between about 1 to about 24 carbon atoms in the alkyl group and a free-radical generating initiator.

Examples of suitable alkyl acrylates (i.e., acrylic acid alkyl ester monomers) include, but are not limited to, linear or branched monofunctional acrylates or methacrylates of non-tertiary alkyl alcohols, where the alkyl groups have from 1 to 24 carbon atoms. Examples of suitable monomers include, but are not limited to: 2-ethylhexyl (meth)acrylate, ethyl (meth)acrylate, methyl (meth)acrylate, n-propyl (meth)acrylate, isopropyl (meth)acrylate, pentyl (meth)acrylate, n-octyl (meth)acrylate, isooctyl (meth)acrylate, isononyl (meth)acrylate, n-butyl (meth)acrylate, isobutyl (meth)acrylate, hexyl (meth)acrylate, n-nonyl (meth)acrylate, isoamyl (meth)acrylate, n-decyl (meth)acrylate, isodecyl (meth)acrylate, dodecyl (meth)acrylate, isobornyl (meth)acrylate, cyclohexyl (meth)acrylate, phenyl meth(acrylate), benzyl meth(acrylate), isostearylacrylate and 2-methylbutyl (meth)acrylate, and combinations thereof. Other suitable monomers include branched long chain acrylates such as those described in U.S. Pat. No. 8,137,807, which is hereby incorporated by reference. Additional suitable alkyl monomers include secondary alkyl acrylates such as those described in U.S. Patent Application Publication No. 2013/0260149, which is hereby incorporated by reference. In one embodiment, the acrylic-based assembly layer includes only alkyl (meth)acrylate monomers with optional vinylester or styrenic monomers. In such cases, the modulus and glass transition temperature (Tg) of the composition can be adjusted by selecting combinations of low and high Tg yielding monomers. In another embodiment, the acrylic-based assembly layer includes between about 60 to about 99 parts by weight of the alkyl(meth)acrylate ester having between about 1 to about 24 carbon atoms in the alkyl group, particularly between about 65 and about 95 parts, and more particularly between about 70 and about 95 parts.

In some embodiments, the precursor composition includes a polar copolymerizable monomer. Examples of suitable polar copolymerizable monomers include, but are not limited to: acrylic acid (AA), methacrylic acid, itaconic acid, fumaric acid, methacrylamide, N-alkyl substituted and N,N-dialkyl substituted acrylamides or methacrylamides where the alkyl group has up to 3 carbons, and N-vinyl lactams. Examples of suitable monomers include, but are not limited to: (meth)acrylamide, N-morpholino (meth)acrylate, N-vinyl pyrolidone and N-vinyl caprolactam. Other suitable polar monomers may include hydroxyl containing monomers such as 2-hydroxyethyl (meth)acrylate, and 2-hydroxypropyl (meth)acrylate, 4-hydroxybutyl(meth)acrylate, and ether containing monomers such as 2-ethoxyethoxyethyl (meth)acrylate, 2-methoxyethoxyethyl(meth)acrylate, and the like. In one embodiment, the acrylic-based assembly layer includes between about 1 and about 40 parts by weight of the polar copolymerizable monomer, particularly between about 5 and about 35 parts, and more particularly between about 5 and about 30 parts.

The monomer composition of the acrylic-based assembly layer may also include a vinyl ester, and particularly a $C_1$ to $C_{10}$ vinyl ester. An example of commercially available suitable vinyl esters include, but are not limited to: vinyl acetate, VeOVA 9 or VeOVA 10, available from Momentive Specialty Chemicals, located at New Smyrna Beach, Fla. The vinyl ester is typically added to the monomer mixtures in an amount of between about 1 parts and about 20 parts by weight, particularly between about 1and about 15 parts, and more particularly between about 1 and about 10 parts. Other monomers, such as styrenic monomers may also be used.

Examples of free-radical generating initiators include, but are not limited to, thermal or photoinitiators. Examples of thermal initiators include, but are not limited to, peroxides such as benzoyl peroxide and its derivatives or azo compounds. An example of a commercially available azo compound includes VAZO 67, available from E. I. du Pont de Nemours and Co. located in Wilmington, Del., which is 2,2'-azobis-(2-methylbutyronitrile). A variety of peroxide or azo compounds are available that can be used to initiate thermal polymerization at a wide variety of temperatures. A photoinitiator may also be used, either replacing the thermal initiator or used in combination with the thermal initiator. Particularly useful photoinitiator includes IRGACURE 651 and Darocur 1173, both available from BASF, located in Tarrytown, N.Y. The initiators are typically added to the precursor mixtures in an amount of between about 0.01 parts to about 2 parts by weight, particularly between about 0.02 and about 1 parts, and more particularly between about 0.02 and about 0.5 parts.

In one embodiment, the monomer mixture includes a multifunctional cross-linker. For example, the precursor mixture may include thermal cross-linkers which are activated during the drying step of preparing solvent coated adhesives and cross-linkers that copolymerize during the polymerization step. Such thermal cross-linkers may include, but are not limited to: multifunctional isocyanates, multi-functional aziridines, and epoxy compounds. Exemplary cross-linkers which can be copolymerized include difunctional acrylates such as 1,6-hexanediol diacrylate or multifunctional acrylates such as are known to those of skill in the art. Useful isocyanate cross-linkers include, for example, an aromatic triisocyanate available as DESMODUR N3300 from Bayer, located in Cologne, Germany. Ultraviolet, or "UV" activated cross-linkers can also be used to crosslink the precursors of the assembly layer. Such UV cross-linkers may include non-copolymerizable photocross-linkers, such as benzophenones and copolymerizable photocrosslinkers such as acrylated or methacrylated benzophenones like 4-acryloxybenzophenones. Typically, the cross-linker, if present, is added to the monomer mixture in an amount of between about 0.01 parts and about 5 parts by weight based, particularly between about 0.01 and about 4 parts, and more particularly between about 0.01 and about 3 parts. Other crosslinking methods, such as ionic crosslinking, acid-base crosslinking, or the use of physical crosslinking methods, such as by copolymerizing high Tg macromers, such as, for example, polymethylmethacrylate macromere or polystyrene macromer, may also be used. Macromers may be used in an amount of about 1 to about 20 parts by weight of the total monomer components in the assembly layer composition.

The acrylic-based assembly layer may be inherently tacky. If desired, tackifiers can be added to the precursor mixture before formation of the acrylic-based assembly layer. Useful tackifiers include, for example: rosin ester resins, aromatic hydrocarbon resins, aliphatic hydrocarbon resins, terpene, and terpene phenolic resins. In general, light-colored tackifiers selected from hydrogenated rosin esters, terpenes, or aromatic hydrocarbon resins are preferred. When included, the tackifier is added to the precursor mixture in an amount of between about 1 parts and about 50 parts by weight, more particularly between about 5 and about 45 parts, and most particularly between about 10 and about 30 parts.

In one embodiment, the acrylic-based assembly layer may be substantially free of acid to eliminate indium tin oxide (ITO) and metal trace corrosion that otherwise could damage touch sensors and their integrating circuits or connectors. "Substantially free" as used in this specification means less than about 2 parts by weight, particularly less than about 1 parts, and more particularly less than about 0.5 parts.

Other materials can be added to the monomer mixture for special purposes, including, for example: molecular weight control agents, coupling agent, oils, plasticizers, antioxidants, UV stabilizers, UV absorbers, pigments, curing agents, polymer additives, nanoparticles, and other additives. In cases where the acrylic-based assembly layer needs to be optically clear, other materials can be added to the monomer mixture, provided that they do not significantly reduce the optical clarity of the assembly layer after polymerization and coating. As used herein, the term "optically clear" refers to a material that has a luminous transmission of greater than about 90 percent, a haze of less than about 2 percent, and opacity of less than about 1 percent in the 400 to 700 nm wavelength range. Both the luminous transmission and the haze can be determined using, for example, ASTM-D 1003-92. Typically, the optically clear assembly layer is visually free of bubbles.

The acrylic-based assembly layer monomeric components can be blended into a precursor mixture. This precursor mixture can be pre-polymerized by exposure to heat or actinic radiation (to decompose initiators in the mixture). This can be done prior to the addition of a cross-linker and other components to form a coatable syrup to which, subsequently, one or more cross-linkers, other additives, and additional initiators can be added. The compounded syrup is then coated on a liner or directly on a substrate and completely polymerized under inert atmosphere by additional exposure to UV. Alternatively, the cross-linker, optional additives, and initiators can be added to monomers and the mixture can be both polymerized and cured in one step (for example, as a liquid OCA). The desired coating method and viscosity will determine which procedure is used.

In another process, the assembly layer monomeric components can be blended with a solvent to form a mixture. The mixture can be polymerized by exposure to heat or actinic radiation (to decompose initiators in the mixture). A cross-linker and additional additives such as tackifiers and plasticizers may be added to the solvated polymer which may then be coated on a liner and run through an oven to dry off solvent to yield the coated adhesive film. Solventless polymerization methods, such as the continuous free radical polymerization method described in U.S. Pat. Nos. 4,619,979 and 4,843,134 (Kotnour et al.); the essentially adiabatic polymerization methods using a batch reactor described in U.S. Pat. No. 5,637,646 (Ellis); and the methods described for polymerizing packaged pre-adhesive compositions described in U.S. Pat. No. 5,804,610 (Hamer et al.) may also be utilized to prepare the polymers.

The disclosed compositions or precursor mixtures may be coated by any variety of techniques known to those of skill in the art, such as roll coating, spray coating, knife coating, die coating, and the like. Alternatively, the precursor composition may also be delivered as a liquid to fill the gap between the two substrates and subsequently be exposed to heat or UV to polymerize and cure the composition in between the two substrates.

The present invention also provides laminates including the acrylic-based assembly layer. A laminate is defined as a multi-layer composite of at least one assembly layer sandwiched between two flexible substrate layers or multiples thereof. For example the composite can be a 3 layer composite of substrate/assembly layer/substrate; a 5-layer composite of substrate/assembly layer/substrate/assembly layer/substrate, and so on. The thickness, mechanical, electrical (such as dielectric constant), and optical properties of each of the flexible assembly layers in such multi-layer stack may be the same but they can also be different in order to better fit the design and performance characteristics of the final flexible device assembly. The laminates have at least one of the following properties: optical transmissivity over a useful lifetime of the article in which it is used, the ability to maintain a sufficient bond strength between layers of the article in which it is used, resistance or avoidance of delamination, and resistance to bubbling over a useful lifetime. The resistance to bubble formation and retention of optical transmissivity can be evaluated using accelerated aging tests. In an accelerated aging test, the acrylic-based assembly layer is positioned between two substrates. The resulting laminate is then exposed to elevated temperatures often combined with elevated humidity for a period of time. Even after exposure to elevated temperature and humidity, the laminate, including the acrylic-based assembly layer, will retain optical clarity. For example, the acrylic-based assembly layer and laminate remain optically clear after aging at 70° C. and 90% relative humidity for approximately 72 hours and subsequently cooling to room temperature. After aging, the average transmission of the adhesive between 400 nanometers (nm) and 700 nm is greater than about 90% and the haze is less than about 5% and particularly less than about 2%.

In use, the acrylic-based assembly layer will resist fatigue over thousands of folding cycles over a broad temperature range from well below freezing (i.e., −30 degrees C., −20 degrees C., or −10 degrees C.) to about 70, 85 or even 90° C. In addition, because the display incorporating the acrylic-based assembly layer may be sitting static in the folded state for hours, the acrylic-based assembly layer has minimal to no creep, preventing significant deformation of the display, deformation which may be only partially recoverable, if at all. This permanent deformation of the acrylic-based assembly layer or the panel itself could lead to optical distortions or Mura, which is not acceptable in the display industry. Thus, the acrylic-based assembly layer is able to withstand considerable flexural stress induced by folding a display device as well as tolerating high temperature, high humidity (HTHH) testing conditions. Most importantly, the acrylic-based assembly layer has exceptionally low storage modulus and high elongation over a broad temperature range (including well below freezing; thus, low glass transition temperatures are preferred) and are cross-linked to produce an elastomer with little or no creep under static load.

During a folding or unfolding event, it is expected that the acrylic-based assembly layer will undergo significant deformation and cause stresses. The forces resistant to these stresses will be in part determined by the modulus and thickness of the layers of the folding display, including the acrylic-based assembly layer. To ensure a low resistance to folding as well as adequate performance, generation of minimal stress and good dissipation of the stresses involved in a bending event, the acrylic-based assembly layer has a sufficiently low storage or elastic modulus, often characterized as shear storage modulus (G'). To further ensure that this behavior remains consistent over the expected use temperature range of such devices, there is minimal change in G' over a broad and relevant temperature range. In one embodiment, the relevant temperature range is between about −30° C. to about 90° C. In one embodiment, the shear modulus is less than about 2 MPa, particularly less than about 1 MPa, more particularly less than about 0.5 MPa, and most particularly less than about 0.3 MPa over the entire relevant temperature range. Therefore, it is preferred to position the glass transition temperature (Tg), the temperature at which the material transitions to a glassy state, with a corresponding change in G' to a value typically greater than about $10^7$ Pa, outside and below this relevant operating range. In one embodiment, the Tg of the acrylic-based assembly layer in a flexible display is less than about 10° C., particularly less than about −10° C., and more particularly less than about −30° C. As used herein, the term "glass transition temperature" or "Tg" refers to the temperature at which a polymeric material transitions from a glassy state (e.g., brittleness, stiffness, and rigidity) to a rubbery state (e.g., flexible and elastomeric). The Tg can be determined, for example, using a technique such as Dynamic Mechanical Analysis (DMA). In one embodiment, the Tg of the acrylic-based assembly layer in a flexible display is less than about 10° C., particularly less than about −10° C., and more particularly less than about −30° C.

The assembly layer is typically coated at a dry thickness of less than about 300 microns, particularly less than about 50 microns, particularly less than about 20 microns, more particularly less than about 10 microns, and most particularly less than about 5 microns. The thickness of the assembly layer may be optimized according to the position in the flexible display device. Reducing the thickness of the assembly layer may be preferred to decrease the overall thickness of the device as well as to minimize buckling, creep, or delamination failure of the composite structure.

The ability of the acrylic-based assembly layer to absorb the flexural stress and comply with the radically changing geometry of a bend or fold can be characterized by the ability of such a material to undergo high amounts of strain or elongation under relevant applied stresses. This compliant behavior can be probed through a number of methods, including a conventional tensile elongation test as well as a shear creep test. In one embodiment, in a shear creep test, the acrylic-based assembly layer exhibits a shear creep compliance (J) of at least about $6\times10^{-6}$ 1/Pa, particularly at least about $20\times10^{-6}$ 1/Pa, about $50\times10^{-6}$ 1/Pa, and more particularly at least about $90\times10^{-6}$ 1/Pa under an applied shear stress of between from about 5 kPa to about 500 kPa, particularly between about 20 kPa to about 300 kPa, and more particularly between about 50 kPa to about 200 kPa. The test is normally conducted at room temperature but could also be conducted at any temperature relevant to the use of the flexible device.

The acrylic-based assembly layer also exhibits relatively low creep to avoid lasting deformations in the multilayer composite of a display following repeated folding or bending events. Material creep may be measured through a simple creep experiment in which a constant shear stress is applied to a material for a given amount of time. Once the stress is removed, the recovery of the induced strain is observed. In one embodiment, the shear strain recovery within 1 minute after removing the applied stress (at at least one point of applied shear stress within the range of about 5 kPa to about 500 kPa) at room temperature is at least about 50%, particularly at least about 60%, about 70% and about 80%, and more particularly at least about 90% of the peak strain observed at the application of the shear stress. The test is normally conducted at room temperature but could also be conducted at any temperature relevant to the use of the flexible device.

Additionally, the ability of the acrylic-based assembly layer to generate minimal stress and dissipate stress during a fold or bending event is critical to the ability of the acrylic-based assembly layer to avoid interlayer failure as well as its ability to protect the more fragile components of the flexible display assembly. Stress generation and dissipation may be measured using a traditional stress relaxation test in which a material is forced to and then held at a relevant shear strain amount. The amount of shear stress is then observed over time as the material is held at this target strain. In one embodiment, following about 500% shear strain, particularly about 600%, about 700%, and about 800%, and more particularly about 900% strain, the amount of residual stress (measured shear stress divided by peak shear stress) observed after 5 minutes is less than about 50%, particularly less than about 40%, about 30%, and about 20%, and more particularly less than about 10% of the peak stress. The test is normally conducted at room temperature but could also be conducted at any temperature relevant to the use of the flexible device.

As an assembly layer, the acrylic-based assembly layer must adhere sufficiently well to the adjacent layers within the display assembly to prevent delamination of the layers during the use of the device that includes repeated bending and folding actions. While the exact layers of the composite will be device specific, adhesion to a standard substrate such as PET may be used to gauge the general adhesive performance of the assembly layer in a traditional 180 degree peel test mode. The adhesive may also need sufficiently high cohesive strength, which can be measured, for example, as a laminate of the assembly layer material between two PET substrates in a traditional T-peel mode.

When the acrylic-based assembly layer is placed between two substrates to form a laminate and the laminate is folded or bent and held at a relevant radius of curvature, the laminate does not buckle or delaminate between all use temperatures (−30° C. to 90° C.), an event that would represent a material failure in a flexible display device. In one embodiment, a multilayer laminate containing the acrylic-based assembly layer does not exhibit failure when placed within a channel forcing a radius of curvature of less than about 200 mm, less than about 100 mm, less than about 50 mm, particularly less than about 20 mm, about 10 mm, and about 5 mm, and more particularly less than about 2 mm over a period of about 24 hours. Furthermore, when removed from the channel and allowed to return from the bent orientation to its previously flat orientation, a laminate including the acrylic-based assembly layer of the present invention does not exhibit lasting deformation and rather rapidly returns to a flat or nearly flat orientation. In one embodiment, when held for 24 hours and then removed from the channel that holds the laminate with a radius of curvature of particularly less than about 50 mm, particularly less than about 20 mm, about 10 mm, and about 5 mm, and more particularly less than about 3 mm, the composite returns to a nearly flat orientation where the final angle between the laminate, the laminate bend point and the return surface is less than about 50 degrees, more particularly less than about 40 degrees, about 30 degrees, and about 20 degrees, and more particularly less than about 10 degrees within 1 hour after the removal of the laminate from the channel. In other words, the included angle between the flat parts of the folded laminate goes from 0 degrees in the channel to an angle of at least about 130 degrees, particularly more than about 140 degrees, about 150 degrees, and about 160 degrees, and more particularly more than about 170 degrees within 1 hour after removal of the laminate from the channel. This return is preferably obtained under normal usage conditions, including after exposure to durability testing conditions.

In addition to the static fold testing behavior described above, the laminate including first and second substrates bonded with the acrylic-based assembly layer does not exhibit failures such as buckling or delamination during dynamic folding simulation tests. In one embodiment, the laminate does not exhibit a failure event between all use temperatures (−30° C. to 90° C.) over a dynamic folding test in free bend mode (i.e. no mandrel used) of greater than about 10,000 cycles, particularly greater than about 20,000 cycles, about 40,000 cycles, about 60,000 cycles, and about 80,000 cycles, and more particularly greater than about 100,000 cycles of folding with a radius of curvature of less than about 50 mm, particularly less than about 20 mm, about 10 mm, and about 5 mm, and more particularly less than about 3 mm.

To form a flexible laminate, a first substrate is adhered to a second substrate by positioning the assembly layer of the present invention between the first substrate and the second substrate. Additional layers may also be included to make a multi-layer stack. Pressure and/or heat is then applied to form the flexible laminate.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following example are on a weight basis.

TABLE 1

| | Materials | |
|---|---|---|
| Acronym | Name | Supplier |
| 2-EHA | 2-Ethylhexyl acrylate | Sigma-Aldrich Co., St. Louis, MO |
| IBOA | Isobornyl acrylate | Sartomer, Exton, PA |
| nBA | n-Butyl acrylate | BASF Corporation, Florham Park, NJ |
| nHA | n-Hexyl acrylate | BASF Corporation, Florham Park, NJ |
| 2ODA | 2-Octyl-1-decyl Acrylate | Prepared following U.S. Pat. No. 8,137,807 |
| DDA | Dodecyl acrylate | Prepared following U.S. patent application publication No. 2013-0260149 |
| HEA | Hydroxyethyl acrylate | Sigma-Aldrich Co., St. Louis, MO |
| HBA | Hydroxybutyl acrylate | TCI America, Portland, OR |
| TDDM | Tertiary dodecyl mercaptan | Sigma-Aldrich Co., St. Louis, MO |
| VAZ0 67 | 2,2'-Azobis-(2-methylbutanenitrile) | DuPont Company, Wilmington, DE |
| D1173 | Darocur 1173 | BASF Corporation, Florham Park, NJ |
| EtAc | Ethyl acetate | VWR International, LLC, Radnor, PA |
| TH130 | Terpene phenolic tackifier | Yasuhara Chemical, Hiroshima, JP |
| B(2EH)S | Bis(2ethylhexyl)Sebacate | Alfa Aesar, Ward Hill, MA |

Test Method 1. Optical Properties

Haze measurements were made using a HunterLab (Reston, Va.) UltrascanPro Spectrophotometer in transmission mode. The assembly layer was coated between release-coated carrier liners (RF02N and RF52N, SKC Haas, Korea) and was cut to approximately 5 cm width by 10 cm length and their thickness was measured. One of the carrier liners was removed and the sample was laminated to a clear piece of 1 mm thick glass. The other liner was then removed and a 2 mil thick layer of optically clear polyethylene terephthalate (PET, Skyrol SH-81 from SKC Haas, Korea) was laminated onto the assembly layer. The sample was placed in the UltrascanPro Spectrophotometer to measure transmission and color through the PET/OCA/glass assembly. Additional samples were prepared and aged in a chamber set to 65° C. and 90% relative humidity for 800 hours. After samples were removed from the humidity chamber and allowed to cool, haze measurements were again conducted. Typically, samples acceptable for optical applications will have haze values of less than about 5%, particularly less than about 2% and b* color values of less than about 5.

Test Method 2. Dynamic Mechanical Analysis

Dynamic mechanical analysis was used to probe the modulus as a function of temperature as well as to determine the glass transition temperature ($T_g$) of the material. An 8 mm diameter by about 1 mm thick disk of the assembly layer was placed between the probes of a DHR parallel plate rheometer (TA Instruments, New Castle, Del.). A temperature scan was performed by ramping from −45° C. to 50° C. at 3° C./min. During this ramp, the samples was oscillated at a frequency of 1 Hz and a strain of approximately 0.4%. The shear storage modulus (G') was recorded at selected key temperatures. The $T_g$ of the material was also determined as the peak in the tan delta vs. temperature profile. To ensure sufficient compliance of the assembly material over the typical range of use temperatures, it is preferred to have the shear storage modulus below about 2 MPa over the entire temperature range from about −20° C. to about 40° C. when measured using the test described above.

Test Method 3. Creep Test

The assembly layer samples were subjected to a creep test by placing a 8 mm diameter by 0.25 mm thick disk in a DHR parallel plate rheometer and applying a shear stress of 95 kPa for 5 seconds at which time the applied stress was removed and the sample was allowed to recover in the fixtures for 60 seconds. The peak shear strain at 5 seconds and the amount of strain recovery after 60 seconds were recorded. The shear creep compliance, J, at any time following the application of the stress is defined as the ratio of the shear strain at that time divided by the applied stress. To ensure sufficient compliance within the assembly layer, it is preferred that the peak shear strain after applying the load in the test described above is greater than about 200%. Furthermore, to minimize material creep within the flexible assembly, it is preferred that the material recover greater that about 50% strain 60 seconds after the applied stress is removed. The percent recoverable strain is defined as $((S_1-S_2)/S_1)*100$ where $S_1$ is the shear strain recorded at the peak at 5 seconds after applying the stress and $S_2$ is the shear strain measured at 60 seconds after the applied stress is removed.

Test Method 4. Stress Relaxation Test

Samples of the assembly layer were subjected to a stress relaxation test by placing an 8 mm diameter by 0.25 mm thick disk in a DHR parallel plate rheometer and applying a shear strain of 900%. The resulting peak stress from this deformation was recorded as well as the stress decay over a 5 minute period. Stress relaxation was calculated by the following equation: $(1-(S_f-S_p))*100\%$ where $S_p$ and $S_f$ are the shear stress recorded at the peak and final (5 minute) points.

Test Method 5. T-Peel Testing

An assembly layer approximately 0.05 mm thick was laminated between two layers of primed polyester that were 0.075 mm in thickness. From this laminate, strips 1 inch wide by 6 inches long were cut for testing. The ends of each strip were placed in the tensile grips of an Instron (Instron, Norwood, Mass.). The construction was then peeled at a rate of 50 mm/min while measuring the force in grams of the peel adhesion. Three peel tests were performed for each Example and the resulting peel force averaged.

Test Method 6. Static Folding Test

A 2 mil thick section of assembly layer was laminated between 1.7 mil sheets of polyimide (PI) to make a 3-layer construction and then cut to a 5 inch length. Additionally, 5-layer constructions comprised of PFAS/PFAS/PI were also prepared in a similar manner with 2 mil assembly layer and 1.7 mil PI. Laminate constructions were also prepared in a similar manner using 4 and 6 mil thick assembly layers between layers of PI. The samples were then bent around a 3 mm radius of curvature and held in that position for 24 hours. After 24 hours the samples were observed to have passed the static hold test if exhibiting no buckling or delamination of the adhesive. Furthermore, after 24 hours the sample was released and allowed to recover, the time required to achieve a 90 degrees and 45 degrees angle versus the plane (i.e. included angle of 90 degrees, respectively 135 degrees) was recorded as well as the final angle, Θ, at the end of 3 minutes. In some instances, samples were unable to recover to 45 degrees or even to 90 degrees versus the plane within the 3 minute testing time. For these samples, the final angle was recorded at the lowest value achieved in that period of time. The static folding test was also repeated holding the samples at a temperature of −20° C. for a 24 hour period.

Test Method 7. Dynamic Folding Test

The liners were removed from a 2 mil thick assembly layer and the material was laminated between two 1.7 mil sheets of polyimide to make a 3-layer construction. This laminate was then cut to a 5" length×1" width. Five-layer constructions comprised of PI/AS/PI/AS/PI were also prepared in a similar manner with 2 mil assembly layer and 1.7 mil PI. The sample was mounted in a dynamic folding device with two folding tables that rotate from 180 degrees (i.e., sample is not bent) to 0 degrees (i.e., sample is now folded) and subjected to 100,000 cycles at a test rate of about 6 cycles/minute. The bend radius of 5 mm was determined by the gap between the two rigid plates in the closed state (0 degrees). No mandrel was used to guide the curvature (i.e. a free bend format was used). Folding was done at room temperature.

Test Method 8. Determination of Molecular Weight Distribution

The molecular weight distribution of the generated polymers were characterized using conventional gel permeation chromatography (GPC). The GPC instrumentation, which was obtained from Waters Corporation (Milford, Mass., USA), included a high pressure liquid chromatography pump (Model 1515HPLC), an auto-sampler (Model 717), a UV detector (Model 2487), and a refractive index detector (Model 2410). The chromatograph was equipped with two 5 micron PLgel MIXED-D columns, available from Varian Inc. (Palo Alto, Calif., USA).

Samples of polymeric solutions were prepared by dissolving polymer or dried polymer materials in tetrahydrofuran at a concentration of 0.5 percent (weight/volume) and filtering through a 0.2 micron polytetrafluoroethylene filter that is available from VWR International (West Chester, Pa., USA). The resulting samples were injected into the GPC and eluted at a rate of 1 milliliter per minute through columns maintained at 35° C. The system was calibrated with polystyrene standards using a linear least squares fit analysis to establish a calibration curve. The weight-average molecular weight ($M_w$) and the polydispersity index (weight-average molecular weight divided by number-average molecular weight) were calculated for each sample against this standard calibration curve.

Examples 1-6: Preparation of Solvent Based Assembly Layer Samples

Assembly layer films were prepared following the compositions provided in Table 2 below. In Example 1, 40 g of 2EHA, 10 g of HBA, 0.05 g of VAZO 67, 0.025 g of TDDM, and 50 g of ethyl acetate were added to a glass bottle. The contents were mixed and purged with nitrogen for 2 minutes before being sealed and placed in a Laundrometer (SDL Atlas, Rock Hill, S.C.) rotating water bath for 24 hours at 60° C. After 24 hours the sample was analyzed using GPC to determine that the polymer had an $M_w$ of 465 kDa and a polydispersity index of 5.75. Then 0.037 g of N3300 crosslinker was added to this solution and mixed for two hours before coating the solution onto 50 micron thick RF02N siliconized polyester release liner (SKC Haas, Korea) using a knife coater with a gap of 5 mil. The coated sample was placed in an oven at 70° C. for 24 hours before a top carrier layer of T50 siliconized polyester release liner (Solutia, USA) was laminated to the assembly layer. This procedure was repeated for Examples 2-6 and Comparative Examples CE1 and CE2 using the formulations provided in Table 2.

TABLE 2

Preparation of Solvent Based Assembly Layer Samples.

| Example | 2-EHA g | DDA g | 2ODA g | HBA g | HEA g | EtAc g | V67 g | TDDM g | N3300 g | $M_w$ kDa |
|---|---|---|---|---|---|---|---|---|---|---|
| CE1 | | | 42.5 | | 7.5 | 50 | 0.05 | 0 | 0.075 | 550 |
| CE2 | | 42.5 | | | 7.5 | 50 | 0.05 | 0.055 | 0.075 | 409 |
| 1 | 40 | | | 10 | | 50 | 0.05 | 0.055 | 0.025 | 465 |
| 2 | 40 | | | 10 | | 50 | 0.05 | 0.055 | 0.075 | 465 |
| 3 | 40 | | | 10 | | 50 | 0.05 | 0.055 | 0.125 | 465 |
| 4 | 40 | | | 10 | | 50 | 0.05 | 0.055 | 0.21 | 465 |
| 5 | | 40 | | 10 | | 50 | 0.05 | 0.055 | 0.125 | 432 |
| 6 | | | 40 | 10 | | 50 | 0.05 | 0.055 | 0.125 | 455 |
| 7 | 42.5 | | | | 7.5 | 50 | 0.05 | 0.055 | 0.15 | 449 |

Examples 18-21: Preparation of Solventless Based Assembly Layer Samples

Assembly layer films were also prepared according to the formulations provided in Table 3 using the following procedure provided in detail for Example 8. In a clear glass jar, 80 g of 2-EHA, 20 g of HBA and 0.02 g of D1173 photoinitiator were mixed. The sample was purged with nitrogen for 5 minutes and exposed to low intensity (0.3 mW/cm²) UV from a 360 nm LED light until a coatable viscosity (~2000 cPs) was achieved. The polymerization was halted by turning off the LED light and purging with air. An additional 0.18 g of D1173 photoinitiator and 0.01 g of HDDA crosslinker was then added to the formulation as indicated in Table 3 and mixed overnight. The viscous polymer solution was then coated between siliconized polyester release liners, RF02N and T50, using a knife coater with a set gap to yield an OCA coating thickness of 2 mils unless otherwise specified. This construction was then irradiated with a blacklight lamp with a total dose of 1500 mJ/cm² of UV-A. A Comparative Example is listed as CE3.

TABLE 3

Preparation of Solventless Based Assembly Layer Samples.

| | Preparation of Coatable Syrup | | | | | | Post Syrup Addition | | | |
|---|---|---|---|---|---|---|---|---|---|---|
| Example | 2-EHA g | DDA g | ODA g | HBA g | IBOA g | D1173 g | D1173 g | HDDA g | TH130 g | B(2EH)S g |
| CE3 | 53 | | | 14 | 33 | 0.02 | 0.18 | 0.01 | | |
| 8 | 80 | | | 20 | | 0.02 | 0.18 | 0.01 | | |
| 9/9b | 80 | | | 20 | | 0.02 | 0.18 | 0.02 | | |
| 10 | 80 | | | 20 | | 0.02 | 0.18 | 0.04 | | |
| 11 | 80 | | | 20 | | 0.02 | 0.18 | 0.06 | | |
| 12 | 80 | | | 20 | | 0.02 | 0.18 | 0.08 | | |
| 13/13b | 80 | | | 20 | | 0.02 | 0.18 | 0.20 | | |
| 14 | 64 | | | 16 | 20 | 0.02 | 0.18 | 0.01 | | |
| 15 | 72 | | | 18 | | 0.02 | 0.16 | 0.018 | 10 | |
| 16 | 64 | | | 16 | | 0.02 | 0.14 | 0.016 | 20 | |
| 17 | | 80 | | 20 | | 0.02 | 0.18 | 0.06 | | |
| 18 | 30 | | 50 | 20 | | 0.02 | 0.20 | 0.01 | | |
| 19 | 25 | | 55 | 20 | | 0.02 | 0.18 | 0.06 | | |
| 20 | | | 64 | 16 | | 0.02 | 0.14 | 0.016 | 20 | |
| 21 | 80 | | | 20 | | 0.04 | 0.20 | 0.10 | | 8 |

Examples 1-19 and Comparative Examples CE1, CE2, and CE3 were tested for $T_g$, modulus, shear creep, and stress relaxation properties as described in Test Methods 2-4 described above. Data are recorded in Table 4 below.

TABLE 4

Rheological Data.

| | | Shear Modulus G' | | | | Shear Creep | | Shear Stress Relaxation | | |
|---|---|---|---|---|---|---|---|---|---|---|
| | | | | | | Strain @ 95 kPa | Recovery @ | Stress @ 900% | Recovery @ | Recovery @ |
| Example | Tg ° C. | 40° C. kPa | 20° C. kPa | 0° C. kPa | −20° C. kPa | Stress % | 60 s % | Strain kPa | 10 s % | 300 s % |
| CE1 | −31 | 4.5 | 8.5 | 18.4 | 65.9 | 10300 | 0 | NT | NT | NT |
| CE2 | −27 | 9.7 | 21.0 | 55.5 | 348.9 | 6300 | 5 | NT | NT | NT |
| CE3 | −11.6 | 61.4 | 109.5 | 490 | 5578.3 | 400 | 94 | 222.7 | 19 | 8 |
| 1 | −35.8 | 20.0 | 35.1 | 69.7 | 233.1 | 2460 | 66 | NT | NT | NT |

TABLE 4-continued

Rheological Data.

| Example | Tg °C. | Shear Modulus G' 40° C. kPa | Shear Modulus G' 20° C. kPa | Shear Modulus G' 0° C. kPa | Shear Modulus G' −20° C. kPa | Shear Creep Strain @ 95 kPa Stress % | Shear Creep Recovery @ 60 s % | Shear Stress Relaxation Stress @ 900% Strain kPa | Shear Stress Relaxation Recovery @ 10 s % | Shear Stress Relaxation Recovery @ 300 s % |
|---|---|---|---|---|---|---|---|---|---|---|
| 2 | −36.2 | 22.0 | 36.1 | 67.7 | 222.4 | 1400 | 86 | NT | NT | NT |
| 3 | −35 | 22.8 | 34.3 | 61.4 | 204.2 | 780 | 85 | NT | NT | NT |
| 4 | −36.4 | 30.1 | 42.9 | 72.1 | 228.1 | 620 | 98 | NT | NT | NT |
| 5 | −30.8 | 11.7 | 20.7 | 45.6 | 203.0 | 1170 | 81 | NT | NT | NT |
| 6 | −30.4 | 5.4 | 9.2 | 18.8 | 65.1 | 1990 | 81 | NT | NT | NT |
| 7 | −32.9 | 20.8 | 35.4 | 65.9 | 248.2 | 1670 | 91 | NT | NT | NT |
| 8 | −38.5 | 36.6 | 49.5 | 71.9 | 187.2 | 1180 | 92 | 152.8 | 22 | 12 |
| 9 | −39.6 | 32.7 | 44.4 | 66.0 | 168.9 | 1340 | 82 | 229.4 | 26 | 15 |
| 10 | −39.4 | 35.0 | 46.1 | 67.8 | 174.7 | 1350 | 73 | 240.6 | 32 | 19 |
| 11 | −39.1 | 34.3 | 44.2 | 63.6 | 159.6 | 970 | 90 | NT | NT | NT |
| 12 | −39.7 | 34.6 | 43.1 | 60.5 | 148.1 | 820 | 89 | 253.6 | 38 | 21 |
| 13 | −39.9 | 55.2 | 60.6 | 75.9 | 166.4 | 270 | 99 | 311.5 | 42 | 11 |
| 14 | −25 | 41 | 57.2 | 124 | 910.8 | 830 | 87 | 243.2 | 18 | 9 |
| 15 | −33.5 | 24.8 | 41.1 | 82 | 350.3 | 1880 | 82 | 204.9 | 11 | 4 |
| 16 | −21.3 | 19.3 | 34.2 | 129.2 | 1344.7 | 2006 | 78 | NT | NT | NT |
| 17 | −35.5 | 22.8 | 30.2 | 48.9 | 163.1 | 1050 | 85 | NT | NT | NT |
| 18 | −40.8 | 29.9 | 40.2 | 54.1 | 114.1 | 1920 | 82 | 161.1 | 16 | 9 |
| 19 | −41.3 | 20.0 | 26.2 | 39.5 | 98.9 | 1290 | 85 | NT | NT | NT |
| 20 | −27.8 | 10 | 22.8 | 68.2 | 511.9 | 1060 | 78 | 158.9 | 4 | 1 |
| 21 | −49.4 | 27.2 | 32.4 | 42.2 | 71.7 | 668 | 93 | 192 | 39 | 19 |

NT: Not Tested

Examples 8-20 and Comparative Example CE3 were tested for optical properties, tensile elongation, and T-Peel adhesion according to Test Methods 1, 5, and 6 and the results are provided in Table 5. T-Peel failure modes are reported as adhesive (Ad), cohesive (Co), or transfer (Tr, slight cohesive failure/ghosting).

TABLE 5

Adhesion and Optical Properties.

| Example | T-Peel g/cm | T-Peel failure | Optical Properties b* | Optical Properties Haze % |
|---|---|---|---|---|
| CE3 | 1320 | Ad | 0.45 | 0.75 |
| 8 | 576 | Ad | 0.42 | 0.7 |
| 9 | 245.3 | Ad | 0.39 | 0.6 |
| 10 | 198 | Ad | NT | NT |
| 11 | 183.5 | Ad | NT | NT |
| 12 | 147.5 | Ad | 0.4 | 0.6 |
| 13 | 147.7 | Ad | 0.43 | 0.8 |
| 14 | 838 | Ad | 0.43 | 0.75 |
| 15 | 733 | Ad | 0.45 | 0.70 |
| 16 | 1360 | Tr | 0.45 | 0.70 |
| 17 | 173 | Ad | 0.4 | 0.65 |
| 18 | 331 | Ad | NT | NT |
| 19 | 127.5 | Ad | 0.42 | 0.6 |
| 20 | 760 | Tr | 0.47 | 0.8 |

All samples were tested under static bend conditions as directed by Test Method 6 and select samples were tested for dynamic bend performance as described in Test Method 7. Results are provided in Table 6 below.

TABLE 6

Static and Dynamic Bending Performance.

| Example | Thickness of OCA Layer(s) (mil) | 24 hour Static Bend Bend radius 3mm 25° C. 3 layer | 24 hour Static Bend Bend radius 3mm 25° C. 5 layer | 24 hour Static Bend Bend radius 3mm −20° C. 5 layer | Static Bend Recovery Radius mm | Static Bend Recovery ⊖ = 90° s | Static Bend Recovery ⊖ = 45° s | Static Bend Recovery ⊖ @ 3 min (degrees) | Dynamic Bend Test 25° C. 100,000 cycles 3 layer | Dynamic Bend Test 25° C. 100,000 cycles 5 layer |
|---|---|---|---|---|---|---|---|---|---|---|
| CE1 | 2 | NT | NT | NT | 5 | 30 | 141 | 15.8 | NT | NT |
| CE2 | 2 | NT | NT | NT | 5 | NA | NA | 93 | NT | NT |
| CE3 | 2 | Pass | Pass | Fail | 5 | NA | NA | 100 | NT | NT |
| 1 | 2 | Pass | NT | NT | 5 | NA | NA | 120 | NT | NT |
| 2 | 2 | Pass | NT | NT | 5 | 5 | 100 | 31.3 | NT | NT |
| 3 | 2 | Pass | NT | NT | 5 | 1 | 10 | 15.4 | NT | NT |
| 4 | 2 | Pass | NT | NT | 5 | 0.2 | 1 | 6.3 | NT | NT |
| 5 | 2 | Pass | NT | NT | 5 | 1 | 8 | 0 | NT | NT |
| 6 | 2 | Pass | NT | NT | 5 | 1 | 8 | 0 | NT | NT |

TABLE 6-continued

Static and Dynamic Bending Performance.

| Example | Thickness of OCA Layer(s) (mil) | 24 hour Static Bend Bend radius 3mm 25° C. 3 layer | 24 hour Static Bend Bend radius 3mm 25° C. 5 layer | 24 hour Static Bend Bend radius 3mm −20° C. 5 layer | Static Bend Recovery Radius mm | Static Bend Recovery ⊖ = 90° s | Static Bend Recovery ⊖ = 45° s | Static Bend Recovery ⊖ @ 3 min (degrees) | Dynamic Bend Test 25° C. 100,000 cycles 3 layer | Dynamic Bend Test 25° C. 100,000 cycles 5 layer |
|---|---|---|---|---|---|---|---|---|---|---|
| 7 | 2 | NT | NT | NT | 5 | 72 | NA | 75 | NT | NT |
| 8 | 2 | Pass | Pass | Pass | 5 | 45 | NA | 80 | Pass | Pass |
| 9 | 2 | Pass | Pass | Pass | 5 | 1 | 120 | 43.4 | NT | NT |
| 9b | 4 | Fail | NT | NT | NT | NT | NT | NT | NT | NT |
| 10 | 2 | Pass | NT | NT | 5 | 0.5 | 24 | 35.7 | NT | NT |
| 11 | 2 | Pass | NT | NT | 5 | 0.1 | 0.7 | 15.5 | NT | NT |
| 12 | 2 | Pass | Pass | Pass | 5 | 0 | 0.3 | 12.3 | Pass | Pass |
| 13 | 2 | Pass | NT | NT | 5 | 0.1 | 18 | 30 | NT | Fail |
| 13b | 6 | Fail | NT | NT | NT | NT | NT | NT | NT | NT |
| 14 | 2 | Pass | NT | NT | 5 | 120 | NA | 85 | NT | NT |
| 15 | 2 | Pass | NT | NT | 5 | NA | NA | 110 | NT | NT |
| 16 | 2 | Pass | Pass | Pass | 5 | NA | NA | 120 | Pass | Fail |
| 17 | 2 | Pass | Pass | Pass | 5 | 0.1 | 4 | 23.6 | NT | Pass |
| 18 | 2 | Pass | Pass | Pass | 5 | 35 | NA | 60 | Pass | Pass |
| 19 | 2 | Pass | Pass | Pass | 5 | 0.1 | 11 | 28.1 | NT | Pass |
| 20 | 2 | Pass | NT | NT | 5 | 180 | NA | 90 | NT | NT |
| 21 | 2 | NT | NT | NT | NT | NT | NT | NT | NT | NT |

NT: Not Tested
NA = Not Achieved: The sample did not return to the angle (⊖) indicated during the 3 minute test

TABLE 7

Creep testing of Ex. 13 and Ex 18 across a range of applied stresses.

| | Stress kPa | Compliance 1/Pa | Recovery @ 60 s |
|---|---|---|---|
| Example 13 | 60 | 4.53E−05 | 94.9% |
| | 70 | 4.41E−05 | 97.0% |
| | 80 | 4.46E−05 | 96.2% |
| | 90 | 5.42E−05 | 86.7% |
| | 95 | 6.80E−05 | 77.8% |
| | 125 | 6.25E−05 | 85.4% |
| | 150 | 6.71E−05 | 69.4% |
| | 175 | 6.70E−05 | 66.8% |
| | 190 | 6.38E−05 | 66.6% |
| | 200 | 7.07E−05 | 60.0% |
| | 250 | Overspeed Error | |
| | 500 | Overspeed Error | |
| Example 18 | 95 | 3.37E−04 | 65.0% |
| | 100 | 3.73E−04 | 54.4% |
| | 125 | 3.57E−04 | 40.9% |
| | 175 | 2.82E−04 | 44.3% |

Although the present invention has been described with reference to preferred embodiments, workers skilled in the art will recognize that changes may be made in form and detail without departing from the spirit and scope of the invention.

What is claimed is:

1. An assembly layer for a flexible device, wherein the assembly layer is derived from precursors comprising:
   an alkyl(meth)acrylate ester having 1 to 24 carbon atoms in the alkyl group; and
   a free-radical generating initiator;
   wherein within a temperature range of between about −30° C. to about 90° C., the assembly layer has a shear storage modulus at a frequency of 1 Hz that does not exceed about 0.5 MPa, a shear creep compliance (J) of at least about $6 \times 10^{-6}$ 1/Pa measured at 5 seconds with an applied shear stress between about 50 kPa and about 500 kPa, and a strain recovery of at least about 50% at at least one point of applied shear stress within the range of about 5 kPa to about 500 kPa, within about 1 minute after removing the applied shear stress.

2. The assembly layer of claim 1, wherein the assembly layer is optically clear.

3. The assembly layer of claim 1, wherein the flexible device is a flexible electronic display.

4. The assembly layer of claim 1, wherein the assembly layer comprises between about 60 and about 95 weight % alkyl(meth)acrylate ester having 1 to 24 carbon atoms in the alkyl group.

5. The assembly layer of claim 1, wherein the assembly layer has a glass transition temperature of up to about 10° C.

6. The assembly layer of claim 1, wherein the assembly layer further comprises a polar copolymerizable monomer.

7. The assembly layer of claim 1, further comprising at least one of a tackifier, a molecular weight control agent, a plasticizer, a stabilizer, a cross-linker, and a coupling agent.

8. A laminate comprising:
   a first flexible substrate;
   a second flexible substrate; and
   an assembly layer positioned between and in contact with the first flexible substrate and the second flexible substrate, wherein the assembly layer is derived from precursors that comprise:
   an alkyl(meth)acrylate ester having 1 to 24 carbon atoms in the alkyl group; and
   a free-radical generating initiator;
   wherein within a temperature range of between about −30° C. to about 90° C., the assembly layer has a shear storage modulus at a frequency of 1 Hz that does not exceed about 0.5 MPa, a shear creep compliance (J) of at least about $6 \times 10^{-6}$ 1/Pa measured at 5 seconds with an applied shear stress between about 50 kPa and about 500 kPa, and a strain recovery of at least about 50% at at least one point of applied shear stress within the range of about 5 kPa to about 500 kPa within about 1 minute after removing the applied shear stress.

9. The laminate of claim 8, wherein the assembly layer is optically clear.

10. The laminate of claim 8, wherein the assembly layer comprises between about 60 and about 95 weight % alkyl (meth)acrylate ester having 1 to 24 carbon atoms in the alkyl group.

11. The laminate of claim 8, wherein the assembly layer further comprises a polar copolymerizable monomer.

12. The laminate of claim 8, wherein the assembly layer has a glass transition temperature of up to about 10° C.

13. The laminate of claim 8, wherein the laminate does not exhibit failure when placed within a channel forcing a radius of curvature of less than about 15 mm over a period of 24 hours at room temperature.

14. The laminate of claim 13, wherein the laminate returns to an included angle of at least about 130 degrees after removal from the channel after the 24 hour period at room temperature.

15. The laminate of claim 8, wherein the laminate does not exhibit failure when subjected to a dynamic folding test at room temperature of about 10,000 cycles of folding with a radius of curvature of less than about 15 mm.

16. A method of adhering a first substrate and a second substrate, wherein both of the first and the second substrates are flexible, the method comprising:
    positioning an assembly layer between the first flexible substrate and the second flexible substrate to form a laminate, wherein the assembly layer is derived from precursors that comprise:
    an alkyl(meth)acrylate ester having 1 to 24 carbon atoms in the alkyl group; and
    a free-radical generating initiator;
    wherein within a temperature range of between about −30° C. to about 90° C., the assembly layer has a shear storage modulus at a frequency of 1 Hz that does not exceed about 0.5 MPa, a shear creep compliance (J) of at least about $6 \times 10^{-6}$ 1/Pa measured at 5 seconds with an applied shear stress between about 50 kPa and about 500 kPa, and a strain recovery of at least about 50% at at least one point of applied shear stress within the range of about 5 kPa to about 500 kPa within about 1 minute after removing the applied shear stress; and
    applying at least one of pressure and heat to form a laminate.

17. The method of claim 16, wherein the assembly layer is optically clear.

18. The method of claim 16, wherein the laminate does not exhibit failure when placed within a channel forcing a radius of curvature of less than about 15 mm over a period of 24 hours at room temperature.

19. The method of claim 18, wherein the laminate returns to an included angle of at least about 130 degrees after removal from the channel after the 24 hour period at room temperature.

20. The method of claim 16, wherein the laminate does not exhibit failure when subjected to a dynamic folding test at room temperature of greater than about 10,000 cycles of folding with a radius of curvature of less than about 15 mm.

* * * * *

UNITED STATES PATENT AND TRADEMARK OFFICE
CERTIFICATE OF CORRECTION

PATENT NO. : 10,640,689 B2  
APPLICATION NO. : 15/573938  
DATED : May 5, 2020  
INVENTOR(S) : Behling et al.

Page 1 of 1

It is certified that error appears in the above-identified patent and that said Letters Patent is hereby corrected as shown below:

On the Title Page

Item (74), Column 2, Lines 1-2, Delete "3M Innovative Properties Compa" and insert -- 3M Innovative Properties Company --, therefor.

Item (57), Column 2, Line 8, Delete "6×10"⁶"" and insert -- $6 \times 10^{-6}$ --, therefor.

In the Specification

Column 4  
    Line 5, Delete "pyrolidone" and insert -- pyrrolidone --, therefor.

Columns 9-10  
    Line 24, Delete "VAZ0" and insert -- VAZO --, therefor.

Columns 9-10  
    Line 29, Delete "Bis(2ethylhexyl)" and insert -- Bis(2-ethylhexyl) --, therefor.

Column 11  
    Line 52, Delete "PFAS/PFAS/PI" and insert -- PI/AS/PI/AS/PI --, therefor.

Column 13  
    Line 16 (approx.), Delete "18-21:" and insert -- 8-21: --, therefor.

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*